United States Patent
Nguyen et al.

(10) Patent No.: US 9,658,918 B2
(45) Date of Patent: May 23, 2017

(54) USER PROMPTED VOLUME RECOVERY

(71) Applicant: Dell Products, LP, Round Rock, TX (US)

(72) Inventors: Giang L. Nguyen, Lowell, MA (US); Matthew C. Harris, Derry, NH (US); Carlos Reyes, Nashua, NH (US)

(73) Assignee: DELL PRODUCTS, LP, Round Rock, TX (US)

( * ) Notice: Subject to any disclaimer, the term of this patent is extended or adjusted under 35 U.S.C. 154(b) by 147 days.

(21) Appl. No.: 14/627,477

(22) Filed: Feb. 20, 2015

(65) Prior Publication Data

US 2016/0246684 A1     Aug. 25, 2016

(51) Int. Cl.
G06F 11/00   (2006.01)
G06F 11/07   (2006.01)
G06F 11/14   (2006.01)

(52) U.S. Cl.
CPC ...... *G06F 11/0793* (2013.01); *G06F 11/0727* (2013.01); *G06F 11/0766* (2013.01); *G06F 11/1448* (2013.01)

(58) Field of Classification Search
CPC ............... G06F 11/1469; G06F 11/327; G06F 11/0727; G06F 11/073; G06F 11/324; G06F 11/32
See application file for complete search history.

(56) References Cited

U.S. PATENT DOCUMENTS

| | | | | |
|---|---|---|---|---|
| 5,835,964 A | * | 11/1998 | Draves | G06F 12/1036 711/207 |
| 2007/0260769 A1 | * | 11/2007 | Arndt | G06F 11/141 710/22 |
| 2007/0294494 A1 | * | 12/2007 | Conti | G06F 12/123 711/158 |
| 2010/0318988 A1 | * | 12/2010 | Barr | G06F 8/60 717/178 |
| 2015/0052328 A1 | * | 2/2015 | Bogsanyi | G06F 3/0647 711/170 |

OTHER PUBLICATIONS

"Self-Healing Storage Explained" Retrieved from the Internet May 5, 2015. http://searchstorage.techtarget.com/feature/Self-healing-storage-explained.
"A Tutorial on Self-Healing Data Storage Systems". Retrieved from Internet May 5, 2015..http://searchdisasterrecovery.techtarget.com/feature/A-tutorial-on-self-healing-data-storage-systems.
Dejiao, N., et al. "Abnormal Access Request Detection based Secure Storage Area Network System", International Journal of Advancements in Computing Technology, 3:6, Jul. 2011.

* cited by examiner

Primary Examiner — Philip Guyton
(74) Attorney, Agent, or Firm — Hamilton, Brook, Smith & Reynolds, P.C.

(57) ABSTRACT

A method of recovering from a data storage error includes determining that a data storage error has occurred. The method further includes, upon receiving direction from the user to recover from the data storage error, evaluating a page map relating a logical storage architecture with a physical storage architecture. The method also includes revising the page map based on the evaluating. The data storage error may be one or more of a (i) a missing page and (ii) a duplicate page.

18 Claims, 5 Drawing Sheets

FIG. 2B-I

| FIG. 2B-I |
| FIG. 2B-II |

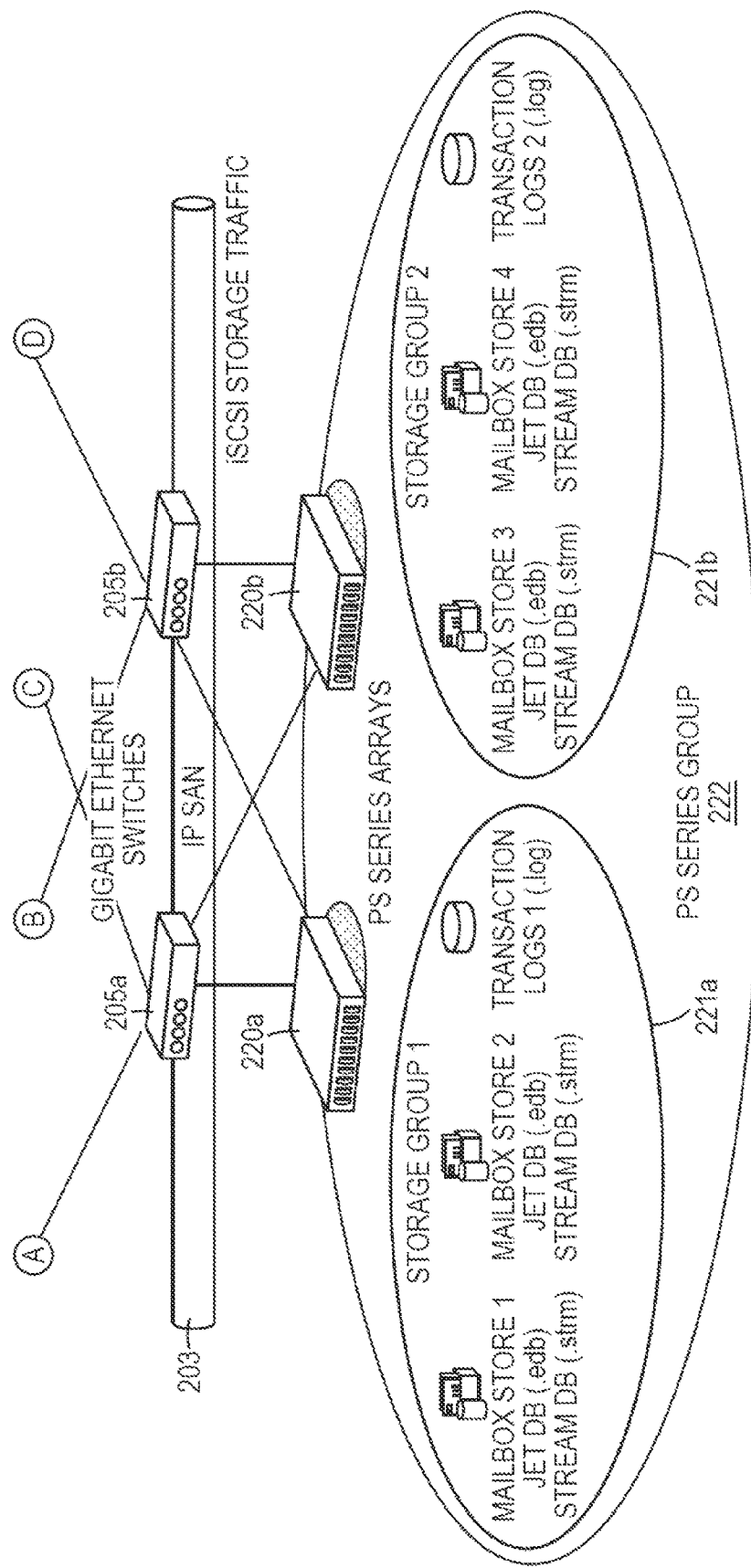
FIG. 2B-II

USER PROMPTED VOLUME RECOVERY

BACKGROUND OF THE INVENTION

As the value and use of information continues to increase, individuals and businesses seek additional ways to process and store information. One option available to users is information handling systems.

An information handling system generally processes, compiles, stores, and/or communicates information or data for business, personal, or other purposes thereby allowing users to take advantage of the value of the information.

Because technology and information handling needs and requirements vary between different users or applications, information handling systems may also vary regarding what information is handled, how the information is handled, how much information is processed, stored, or communicated, and how quickly and efficiently the information may be processed, stored, or communicated.

The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems (which may be configured as a Storage Area Network (SAN)), and networking systems.

Data storage systems may use data block storage virtualization as an avenue for storing and retrieving data. A "volume" presents a storage abstraction of individually addressable logical blocks to which data can be stored and retrieved. This virtualization layer, situated on top of the physical storage media, can provide flexibility to manage modern storage features, offload work and reduce bandwidth over the network. The volume may be thought of as a logical storage architecture.

Occasionally a volume may go offline unexpectedly. An offline event may occur due to missing pages and/or duplicate pages, which can stem from various hardware or firmware issues on the storage platform. When this issue occurs, the volume, and data stored within the volume, may not be accessible to users or applications. This leaves users unable to access their applications and/or data.

It may take a significant amount of time (e.g., hours or more) for a user to open a support request and engage proper support personnel to just start the data gathering process. Appropriate data will need to be gathered and analyzed. Depending upon the analysis, further data may be needed. A plan of action may then be provided to resolve the issues that caused the volume to go offline. The total amount of time from when a volume goes offline until it is available for use again may therefore take tens of hours, or more.

SUMMARY OF THE INVENTION

In one aspect, the invention may be a method of recovering from a data storage error, comprising determining that a data storage error has occurred and, upon receiving direction from the user to recover from the data storage error, evaluating a page map relating a logical storage architecture with a physical storage architecture. The method may further include revising the page map based on the evaluating.

In one embodiment, the data storage error may be one or more of a (i) a missing page and (ii) a duplicate page.

One embodiment further includes conveying, to a user, notification of the data storage error. In one embodiment, revising the page map includes creating a new page in the page map when the evaluating indicates a missing page. In one embodiment, the new page may be an empty page. In another embodiment, revising the page map includes eliminating a page in the page map when the evaluating indicates a duplicate page.

In one embodiment, eliminating a page further includes eliminating a page determined to be not in use. In another embodiment, eliminating a page further includes eliminating a page having a lower associated number value in the event both duplicate pages are not in use.

One embodiment further includes creating a clone of the logical storage architecture prior to eliminating the page in the page map. In one embodiment, evaluating a page map further includes stopping page movement if page movement is determined to be running.

In another aspect, the invention may be a method of recovering from missing or duplicate data block in a logical overlay of a physical storage array, comprising determining that a data block issue has occurred, evaluating a page map relating a logical storage architecture with a physical storage architecture, and revising the page map based on the evaluating.

One embodiment further includes waiting for user authorization before revising the page map.

In another aspect, the invention may be a non-transitory computer-readable medium with computer code instruction stored thereon, the computer code instructions when executed by an a processor cause an apparatus to determine that a data storage error has occurred, and upon receiving direction from the user to recover from the data storage error, evaluate a page map relating a logical storage architecture with a physical storage architecture. The computer code instructions, when executed by a processor, may further cause the apparatus to revise the page map based on the evaluating.

In one embodiment, the computer code instructions, when executed by a processor, further cause the apparatus to convey, to a user, notification of the data storage error.

In another embodiment, the computer code instructions, when executed by a processor, further cause the apparatus to create a new page in the page map when the evaluating indicates a missing page.

In another embodiment, the computer code instructions, when executed by a processor, further cause the apparatus to eliminate a page in the page map when the evaluating indicates a duplicate page.

In another embodiment, the computer code instructions, when executed by a processor, further cause the apparatus to eliminate a page determined to be not in use.

In one embodiment, the computer code instructions, when executed by a processor, further cause the apparatus to eliminate a page having a lower associated number value in the event both duplicate pages are not in use.

In another embodiment, the computer code instructions, when executed by a processor, further cause the apparatus to stop page movement if page movement is determined to be running.

In another embodiment, the computer code instructions, when executed by a processor, further cause the apparatus to find and log one or more of missing and duplicate pages.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Reliable access to data is a prerequisite for most computer systems and applications. There are several factors that cause unexpected or unauthorized modifications to stored data that have the capacity to cause a volume to go off-line. Servers and storage systems generally have built-in data integrity checking features that, upon detecting a lost block or data corruption, will take a volume off-line to prevent or at least minimize damage.

Data corruption can occur due to hardware malfunctions, software malfunctions, or both. The data corruption may result from power outages, voltage spikes, RAID/firmware code, silent data corruption at the disk layer, among others.

The described embodiments concern recovering from one or more of missing storage blocks (e.g., pages) or duplicate storage blocks within a logical volume. Missing pages may occur due to a hardware issue in the underlying storage arrays. In other words, if one or more solid state drives in a storage array malfunctions, that malfunctioning hardware may appear as a missing page or pages within the volume.

Duplicate pages may occur as a result of an interruption of ordinary data storage maintenance operations. Since a volume is a logical overlay over pools and arrays of physical storage devices, no strict one-to-one relationship exists between the volume and the physical storage media. One type of storage maintenance operation involves moving storage blocks around with respect to fixed locations within the physical media. Such page movement may be done for various reasons, for example load balancing or space balancing. For example, rearranging volume data blocks within the physical media can increase data recall efficiency.

Either a duplicate or missing data block within a volume may cause the entire volume to be taken offline as a precaution, since either of these conditions can lead to damage to the host processing system.

Figure 1A:
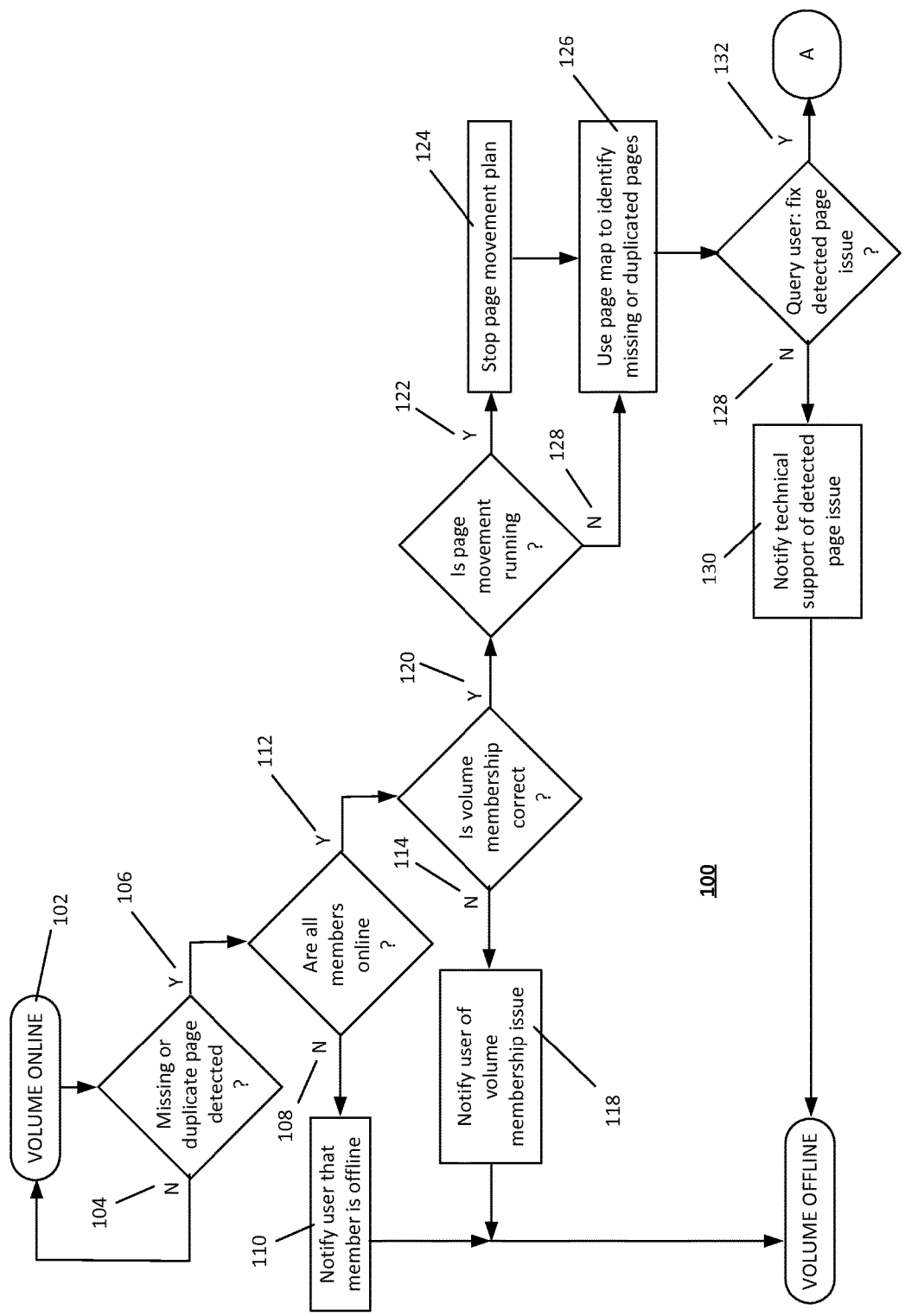
FIGS. 1A and 1B illustrate one example embodiment that may return an offline volume to an online state.
Figure 1B:
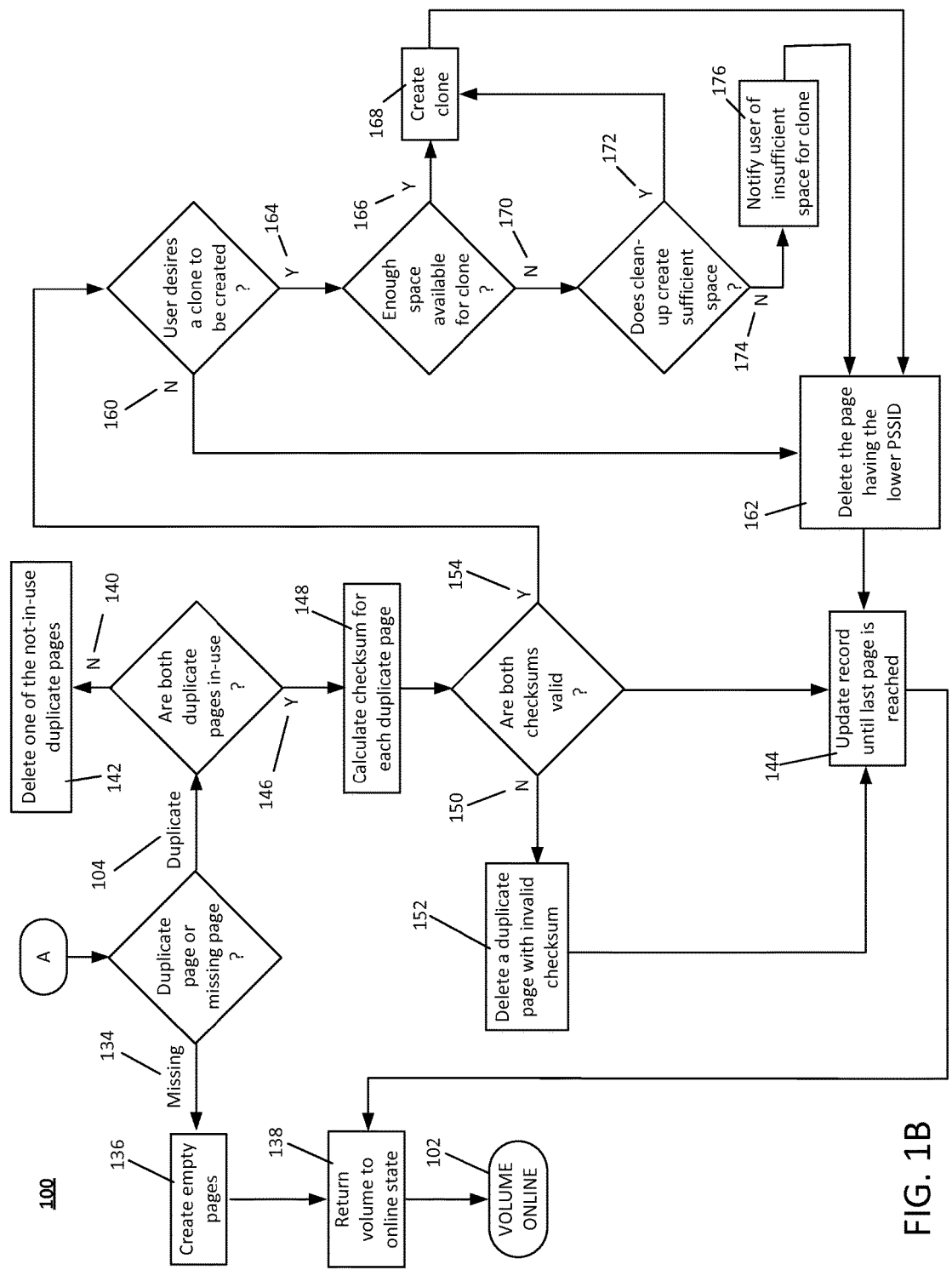

The described embodiments provide an efficient way for an offline volume to be returned online. FIGS. 1A and 1B illustrate one example embodiment 100 of how such an offline volume may be returned online. Initially, the volume is online 102. If no missing or duplicate pages are detected 104, the volume remains online. If a missing or duplicate page is detected 106, the example embodiment 100 determines if all hardware storage members (e.g., elements of storage arrays, storage pools) are online. If all members are not online 108, the example embodiment 100 notifies a user, or other entity responsible for system repair/maintenance, that one or more storage members are offline. If all hardware storage members are online 112, the example embodiment 100 determines whether or not the volume membership is correct.

Correct volume membership may be determined by first checking volume properties to determine how many, and which, storage array members contribute to a particular volume. Each of the identified array members are then observed to determine that they actually do support a portion of the volume. Any discrepancy is reported as a volume membership issue.

If the volume membership is not correct, the example embodiment 100 notifies 118 a user, or other entity responsible for system repair/maintenance, that a volume membership issues exists. If the volume membership is correct, the example embodiment 100 determines if page movement is running.

Page movement, as described herein, is a maintenance operation that moves storage blocks around with respect to fixed locations within the physical media, to provide a service such as load balancing or space balancing. Generally, a page movement plan is used to define how and when logical pages should be moved within the physical media.

If page movement is running 122, the example embodiment 100 causes the page movement plan to be temporarily suspended, so that the page movement stops 124. The example embodiment then uses the page map to identify missing or duplicate pages 126. If the example embodiment determines that the page movement is not running 128, the example embodiment 100 uses the page map to identify missing or duplicate pages 126.

Once the duplicate and/or missing pages have been identified 126, the example embodiment 100 submits a query to the user, or other entity responsible for system repair/maintenance, asking if the detected issue (i.e., duplicate and/or missing page) should be fixed. "Fixing" may include, for example, eliminating the duplicate page and/or establishing a page to account for the page that is missing.

If the user responds to the query by declining to fix the issue 128, the example embodiment 100 notifies 130 the user, or other entity responsible for system repair/maintenance, of the detected page issue. If the user responds to the query by indicating a desire 132 to fix the detected page issue, the example embodiment 100 proceeds as shown in FIG. 1B.

If the page issue is one or more missing pages 134, the example embodiment creates an empty page 136 for each missing page. Although the empty pages cannot account for any data that may have been stored in the page that went missing, the empty page or pages account for storage space designated at the logical overlay of the physical storage arrays. The example embodiment 100 then returns 138 the volume to the online state 102.

If the page issue is one or more duplicate pages, the example embodiment 100 checks to determine if both of the duplicate pages are in-use. If one or both of the pages are determined to be not in-use 140, the embodiment 100 deletes 142 one of the duplicate pages, updates 144 the volume record until the last page of the record is reached, then returns 138 the volume to the online state 102.

If both duplicate pages are determined to be in-use, the example embodiment 100 calculates a checksum of the data associated with each duplicate page. If one or both of the checksums is not valid 150, the example embodiment 100 deletes 152 one page with an invalid checksum. If both of the checksums are valid 154, the choice of which page to delete may be arbitrary or it may depend on a different parameter associated with the duplicate pages.

Once a duplicate page has been deleted, the embodiment 100 updates 144 the volume record until the last page of the record is reached, then returns 138 the volume to the online state 102.

If both checksums are valid, the embodiment 100 may query the user regarding whether or not a clone of the volume (or other portion of memory) should be created. A clone provides a way to preserve the volume state, so that the user can recover data if a subsequent operation (e.g., deletion) is later determined to be incorrect. A clone is a mirror image of a volume. When a clone is taken of a volume, a new "cloned" volume is created, which is the same size as original volume, and all data from the original volume is copied to the clone. The cloned volume is put off-line during this process. The clone volume essentially allows a subsequent deletion or other undesired/erroneous operation to be undone. In the rare situation where a user and/or support entity cannot get the original volume to come back online, a support entity can revert back to the clone volume. Because the clone volume has had no duplicate page entries removed, support can then remove the duplicate page that was not removed on the original volume. This would fix the duplicate page issue. The clone volume would then be put online for use by customer. The original volume could then be deleted by user and/or a support entity.

The following example scenario further illustrates how a clone volume may be used with the described embodiments. A volume, in this case referred to as VOL_1, goes offline due to duplicate pages. A new volume, which is a clone of VOL_1, is created. This new volume, called VOL_1_Clone, is initially offline. VOL_1_Clone has the same duplicate page issue as VOL_1, since it is an exact copy of VOL_1. VOL_1 may be evaluated to find the incorrect duplicate page, and make the decision to delete that particular duplicate page found on VOL_1. If deleting the particular duplicate page correctly resolves the duplicate page issue, the VOL_1 may be brought back online. The VOL_1_Clone can be deleted, since it is no longer needed. If, however, deleting the particular duplicate page does not correctly resolve the duplicate page issue, VOL_1 remains offline. Reverting to VOL_1_Clone, which is still offline, the opposite duplicate page on VOL_1_Clone is deleted (i.e., the page of the duplicate pair that was not deleted previously on VOL_1). If deleting the other duplicate page correctly resolves the duplicate page issue, VOL_1_Clone is brought online and the original VOL_1 is deleted.

If the user does not want a clone to be created 160, the embodiment 100 compares the subsystem identifier of the primary storage control (PSSID) associated with each page, and deletes 162 the page having the lower value PSSID. In other embodiments, alternative parameters of the duplicate pages may be compared to select one of the duplicate pages for deleting. The embodiment 100 then updates 144 the volume record until the last page of the record is reached, then returns 138 the volume to the online state 102.

If the user desires a clone to be created 164, the embodiment 100 may determine if sufficient space is available to create a clone. If sufficient space exists 166, a clone is created 168 and the embodiment 100 deletes 162 the page having the lower value PSSID as described above. If available space is insufficient for creating a clone 170, the embodiment may require the user to carry out a memory clean-up procedure to free up space. If the cleanup procedure frees up sufficient space for the clone 172, a clone is created 168 and the embodiment 100 deletes 162 the page having the lower value PSSID as described above.

If the cleanup procedure cannot free up sufficient space for a clone 174, the user may be notified 176 that insufficient space exists for a clone. The embodiment 100 still deletes 162 the page having the lower value PSSID as described above, without creating a clone. In some embodiments, the user may be given an option (not shown) to halt processing when it is determined that insufficient space exists for a clone, to avoid deleting either page.

Figure 2A:
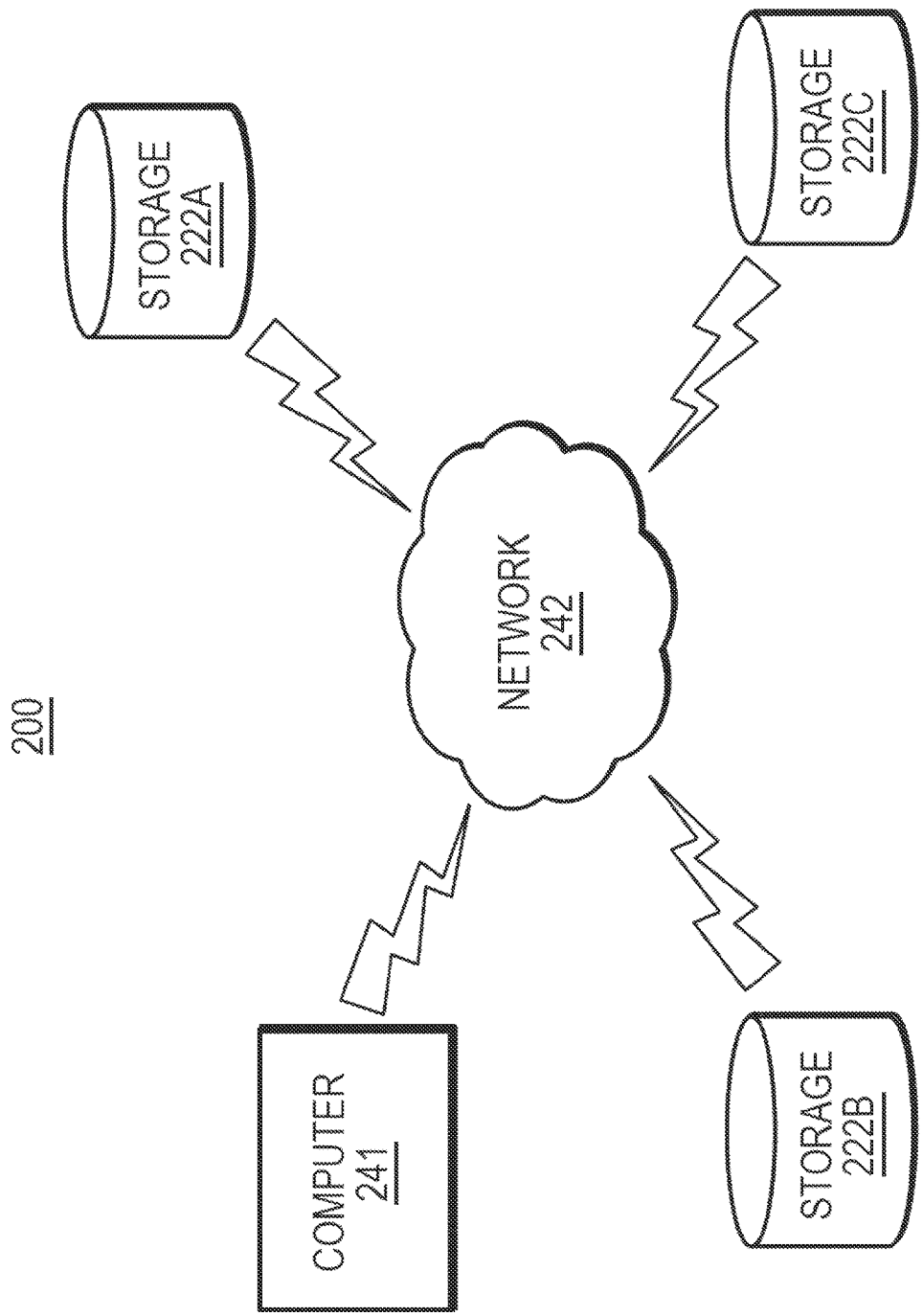
FIG. 2A is a schematic view of a computer network environment in which an embodiment of the present invention may be implemented.

FIG. 2A illustrates a computer network environment 200 in which an embodiment of the present invention may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an Information Handling System (IHS). While three sets 222A, 222B, 222C of storage devices are depicted, the computer network environment 200 may comprise any number of storage devices.

Figure 2B:
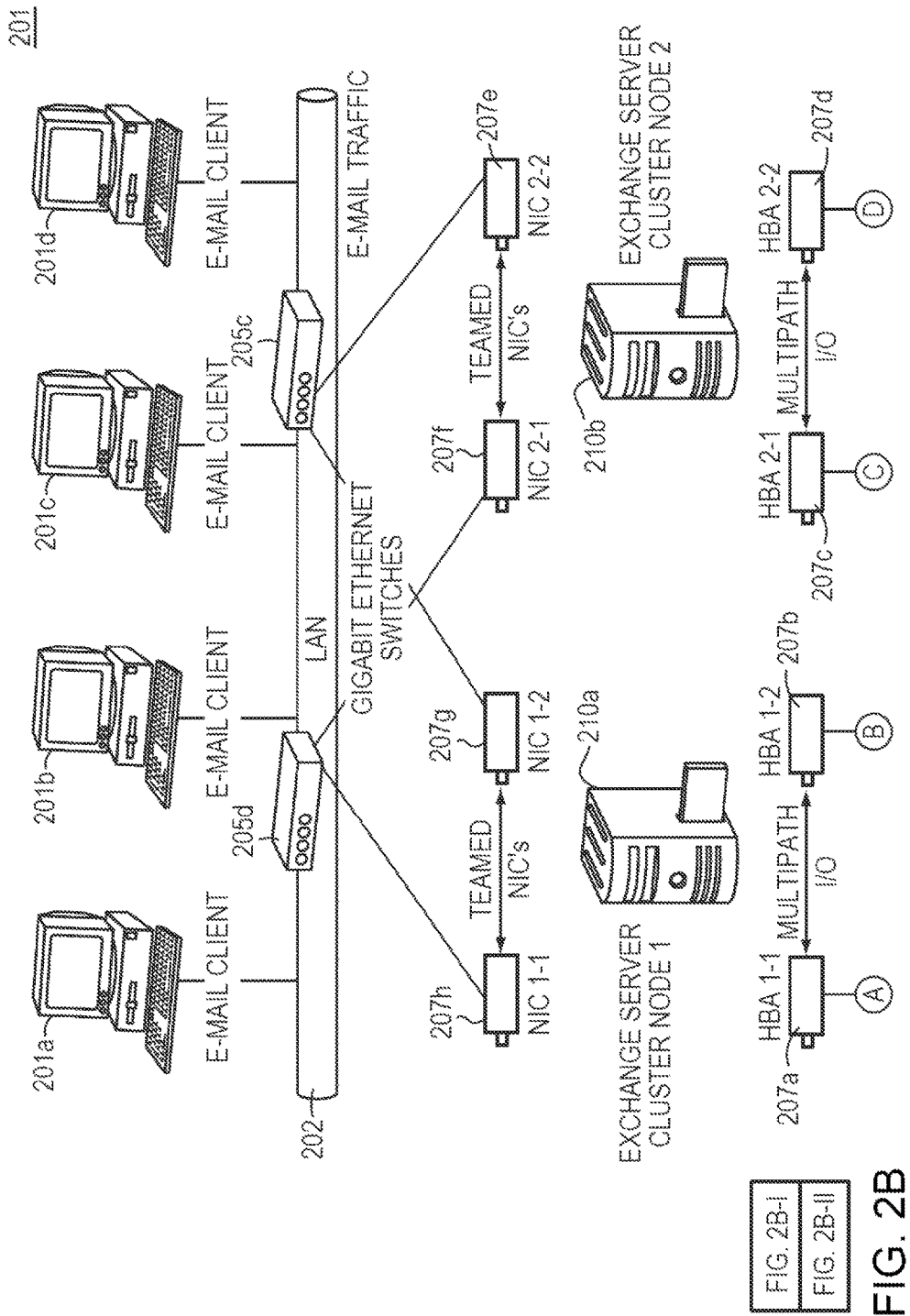
FIG. 2B (FIGS. 2B-I and 2B-II) is a block diagram view of another computer network environment in which an embodiment of the present invention may be implemented.

As illustrated in FIG. 2B (FIGS. 2B-I and 2B-II), in one embodiment, the present invention may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an internet protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited, to, storage groups 221a, 221b and PS series data arrays 220a, 220b. The PS series group 222 may include a given set (referring to each of 222A, 222B, and 222C of FIG. 2A) of storage devices. In an alternative embodiment, the SAN 203 may be considered to include the LAN 202 and the above-mentioned components with which the LAN 202 communicates, in addition to the above-mentioned components with which the SAN 203 communicates.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of recovering from a data storage error, comprising:
   determining that a data storage error has occurred;
   upon receiving direction from the user to recover from the data storage error, evaluating a page map relating a logical storage architecture with a physical storage architecture;
   revising the page map based on the evaluating, including eliminating a page in the page map when the evaluating indicates a duplicate page.

2. The method of claim 1, wherein the data storage error is one or more of a (i) a missing page and (ii) a duplicate page.

3. The method of claim 1, further comprising conveying, to a user, notification of the data storage error.

4. The method of claim 1, wherein revising the page map includes creating a new page in the page map when the evaluating indicates a missing page.

5. The method of claim 4, wherein the new page is an empty page.

6. The method of claim 1, wherein eliminating a page further includes eliminating a page determined to be not in use.

7. The method of claim 1, wherein eliminating a page further includes eliminating a page having a lower associated number value in the event both duplicate pages are not in use.

8. The method of claim 1, further including creating a clone of the logical storage architecture prior to eliminating the page in the page map.

9. The method of claim 1, wherein evaluating a page map further includes stopping page movement if page movement is determined to be running.

10. A method of recovering from missing or duplicate data block in a logical overlay of a physical storage array, comprising:
    determining that a data block issue has occurred;
    evaluating a page map relating a logical storage architecture with a physical storage architecture;
    revising the page map based on the evaluating, including eliminating a page in the page map when the evaluating indicates a duplicate page.

11. The method of claim 10, further including waiting for user authorization before revising the page map.

12. A non-transitory computer-readable medium with computer code instruction stored thereon, the computer code instructions when executed by an a processor cause an apparatus to:
    determine that a data storage error has occurred;
    upon receiving direction from the user to recover from the data storage error, evaluate a page map relating a logical storage architecture with a physical storage architecture;
    revise the page map based on the evaluating, by eliminating a page in the page map when the evaluating indicates a duplicate page.

13. The non-transitory computer-readable medium of claim 12, the computer code instructions, when executed by a processor, further cause the apparatus to convey, to a user, notification of the data storage error.

14. The non-transitory computer-readable medium of claim 12, the computer code instructions, when executed by a processor, further cause the apparatus to create a new page in the page map when the evaluating indicates a missing page.

15. The non-transitory computer-readable medium of claim 12, the computer code instructions, when executed by a processor, further cause the apparatus to eliminate a page determined to be not in use.

16. The non-transitory computer-readable medium of claim 12, the computer code instructions, when executed by a processor, further cause the apparatus to eliminate a page having a lower associated number value in the event both duplicate pages are not in use.

17. The non-transitory computer-readable medium of claim 12, the computer code instructions, when executed by a processor, further cause the apparatus to stop page movement if page movement is determined to be running.

18. The non-transitory computer-readable medium of claim 12, the computer code instructions, when executed by a processor, further cause the apparatus to find and log one or more of missing and duplicate pages.

* * * * *